(12) United States Patent
Rotem

(10) Patent No.: US 11,518,471 B2
(45) Date of Patent: Dec. 6, 2022

(54) FOOT PROPULSION ASSEMBLY

(71) Applicant: React Active Bike Ltd., Katzir (IL)

(72) Inventor: Nir Rotem, Katzir (IL)

(73) Assignee: React Active Bike Ltd., Katzir (IL)

( * ) Notice: Subject to any disclaimer, the term of this patent is extended or adjusted under 35 U.S.C. 154(b) by 0 days.

(21) Appl. No.: 16/760,517

(22) PCT Filed: Nov. 1, 2018

(86) PCT No.: PCT/IB2018/058579
§ 371 (c)(1),
(2) Date: Apr. 30, 2020

(87) PCT Pub. No.: WO2019/087120
PCT Pub. Date: May 9, 2019

(65) Prior Publication Data
US 2021/0197923 A1    Jul. 1, 2021

Related U.S. Application Data

(60) Provisional application No. 62/580,554, filed on Nov. 2, 2017.

(51) Int. Cl.
| | | |
|---|---|---|
| *B62M 3/00* | (2006.01) | |
| *B62M 3/04* | (2006.01) | |
| *B62M 3/06* | (2006.01) | |
| *B62M 3/08* | (2006.01) | |

(52) U.S. Cl.
CPC ............. *B62M 3/04* (2013.01); *B62M 3/06* (2013.01); *B62M 3/08* (2013.01)

(58) Field of Classification Search
CPC . B62M 3/02; B62M 3/04; B62M 3/06; B62M 3/12; B62M 3/16; B62M 3/08; B62M 3/083; G05G 1/30; G05G 1/38
See application file for complete search history.

(56) References Cited

U.S. PATENT DOCUMENTS

| | | | |
|---|---|---|---|
| 597,911 A | 1/1898 | Morris | |
| 1,227,743 A | 5/1917 | Burgedorff | |
| 4,103,563 A * | 8/1978 | Genzling | B62M 3/083 |
| | | | 74/594.5 |
| 4,969,373 A * | 11/1990 | Good | B62M 3/083 |
| | | | 188/24.11 |

(Continued)

FOREIGN PATENT DOCUMENTS

| | | | | |
|---|---|---|---|---|
| CA | 2307608 A1 * | 5/1999 | | B62M 1/10 |
| DE | 4311404 A1 * | 10/1994 | | B62M 3/04 |

(Continued)

OTHER PUBLICATIONS

Machine translation of DE 4311404 A1 obtained on May 10, 2021.*
Machine translation of DE 202014006014 U1 obtained on May 10, 2021.*

(Continued)

*Primary Examiner* — Adam D Rogers
(74) *Attorney, Agent, or Firm* — David Klein

(57) ABSTRACT

A bicycle pedal assembly includes a crank arm, one end of which is pivotally connected to a propulsion axle of a bicycle and another end of which is pivotally connected to a first pivot at one end of an auxiliary crank arm. A pedal is connected to another end of the auxiliary crank arm and a pedal tilt limiter is coupled to the pedal and configured to limit tilt or rotation of the pedal.

9 Claims, 13 Drawing Sheets

(56) References Cited

U.S. PATENT DOCUMENTS

| | | | | |
|---|---|---|---|---|
| 5,078,026 A * | 1/1992 | Giffin | ............... | B62M 3/083 |
| | | | | 74/594.6 |
| 5,404,771 A * | 4/1995 | Soma | ............... | B62M 3/083 |
| | | | | 601/36 |
| 5,899,119 A | 5/1999 | Coment | | |
| 8,689,645 B2 * | 4/2014 | Watarai | ............. | G01L 3/1435 |
| | | | | 73/862.381 |
| 8,777,804 B2 * | 7/2014 | Takachi | ............. | B60W 20/10 |
| | | | | 477/3 |
| 9,003,922 B2 * | 4/2015 | Torino | ............... | B62M 3/003 |
| | | | | 74/594.4 |
| 10,569,830 B2 * | 2/2020 | Davis | ............... | B62M 3/08 |
| 2016/0159435 A1 * | 6/2016 | Yehuda | ............. | B60W 10/08 |
| | | | | 180/220 |

FOREIGN PATENT DOCUMENTS

| | | | | |
|---|---|---|---|---|
| DE | 102010053629 A1 * | 6/2012 | ............. | B62M 3/04 |
| DE | 202014006014 U1 * | 8/2014 | ............. | B62J 6/20 |
| EP | 2842844 | 3/2015 | | |
| FR | 370662 A * | 2/1907 | ............. | B62M 3/04 |
| FR | 2283042 | 3/1976 | | |
| GB | 814128 A * | 5/1959 | ............. | B62M 3/02 |
| WO | 88/09534 | 5/1988 | | |
| WO | 89/04791 | 6/1989 | | |

OTHER PUBLICATIONS

PCT Search Report and Written Opinion PCT/IB2018/058579, dated Feb. 28, 2019.

\* cited by examiner

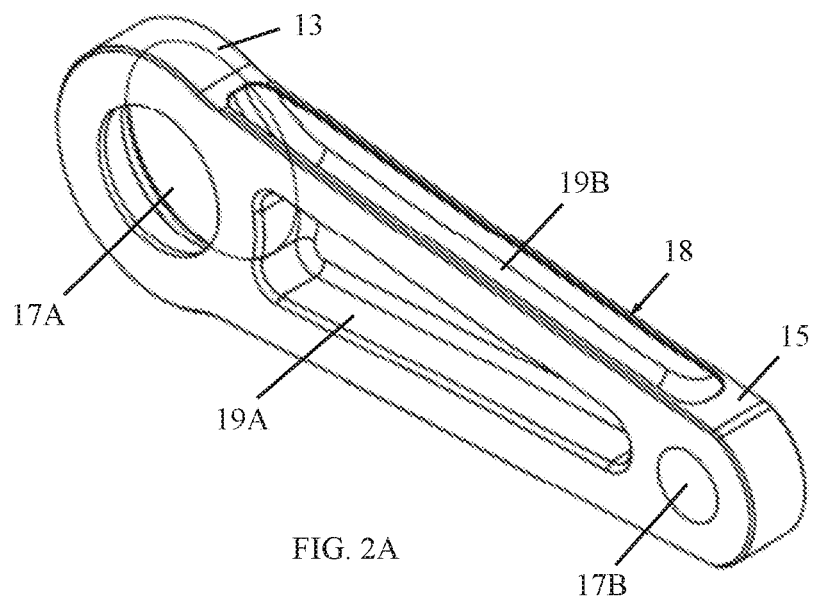
FIG. 2A
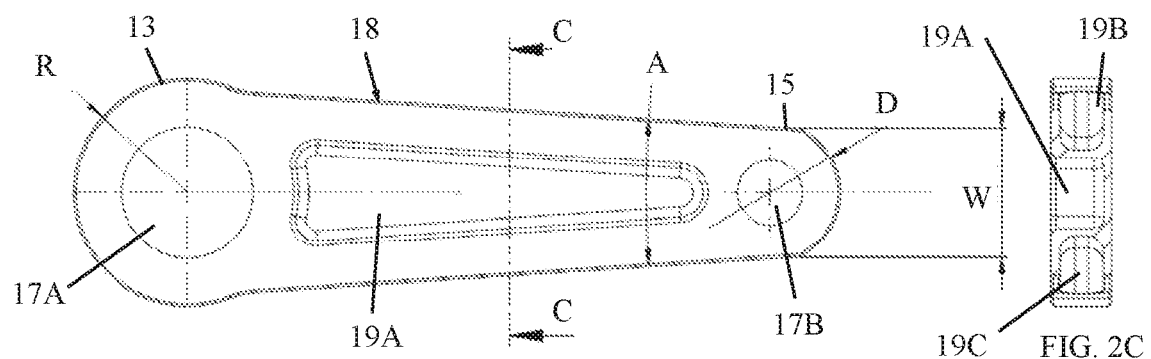
FIG. 2B
FIG. 2C

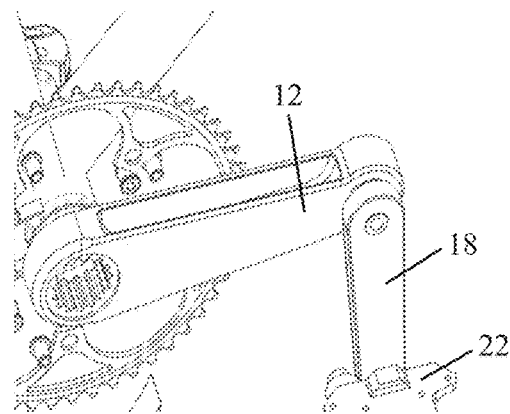
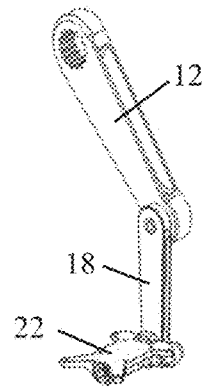
FIG. 9A
FIG. 9B
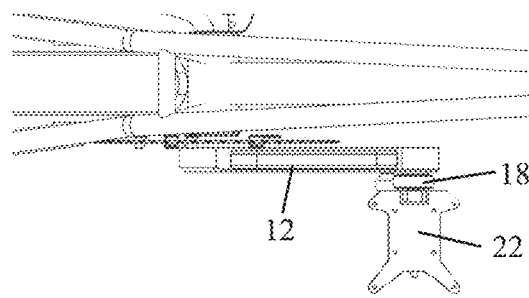
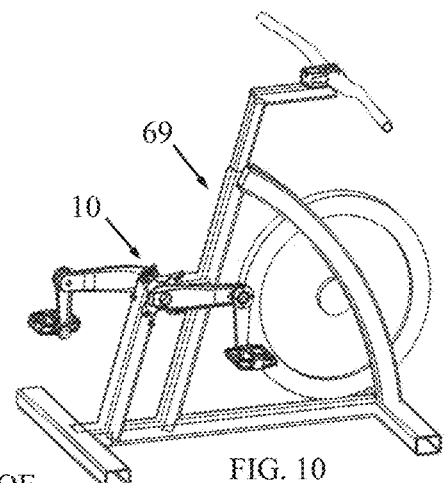
FIG. 9C
FIG. 10
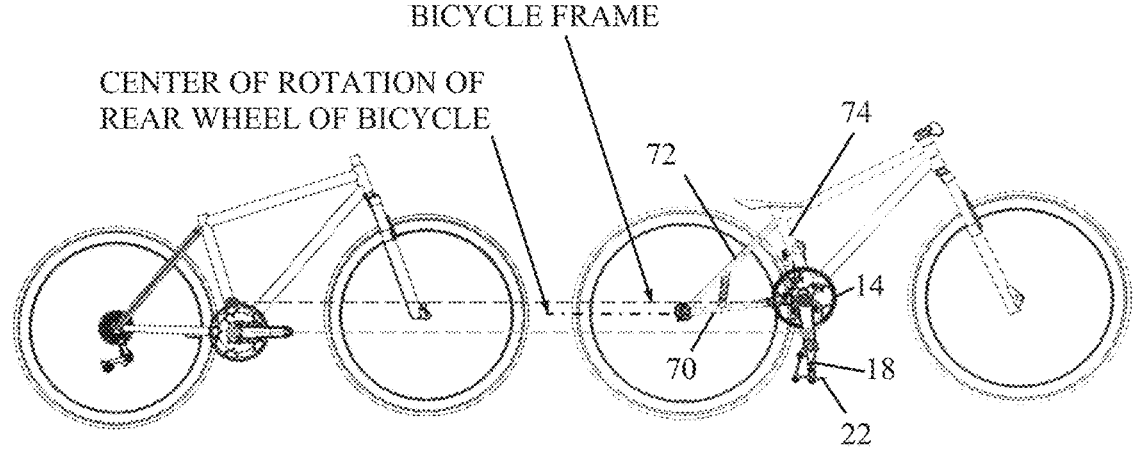
BOTTOM BRACKET OF BICYCLE FRAME
CENTER OF ROTATION OF REAR WHEEL OF BICYCLE
FIG. 11A
PRIOR ART
FIG. 11B

FOOT PROPULSION ASSEMBLY

FIELD OF THE INVENTION

The present invention relates generally to foot propelled vehicles, such as outdoor and fitness bicycles, and particularly to a pedal and crank assembly for a bicycle, which has an auxiliary crank arm and other features, such as adjustable length, a pedal tilt limiter that may also serve as a shock absorber, measurement devices and other features.

BACKGROUND OF THE INVENTION

During running and walking, the human body tends to move its center of mass up and down in an oscillatory motion, generally perpendicular to the forward direction of the body movement. Maintaining and controlling the movement of the center of mass is implemented mainly by using timed movement of leg joints: hip (pelvis), knee and ankle (foot). The timing of the movements of the legs and leg joints varies as a function of the nature and speed of movement. The movements are independent and are not forced mechanically or geometrically from one on another. The timing originates in the brain and neuronal control system, and is not a mechanical function of the skeleton. The human motion is significantly affected and determined by the gravity force.

Consequently, the time duration of the movements during different stages of walking or running is not symmetrical. For example, during walking (gait cycle), the foot is in in contact with the ground (stance phase) around 60% of the time, whereas approximately 40% of the time is free movement (swing phase). In contrast, in running, the stance phase may only be about 40% of the time, 30% swing phase and 30% floating phase. Any restriction in movement of any of the joints (e.g., knee, pelvis or ankle) may force the body to compensate in order to overcome and sustain the movement. An example of this is walking like a compass (compass gait, see below for bicycle riding while standing), in which the legs move with little movement of the knee joint; this type of constraining force increases up and down movement of the center of mass in order to move the legs forward.

Bicycle riding is most often done in a sitting position, in which the center of mass remains basically in the same spatial position relative to the bicycle frame (on the seat). However, riding while sitting can cause many health problems over time. Riding while sitting produces less effective training, involving only limited sets of muscles. In contrast, bicycle riding in a standing position can have many advantages, as will be discussed below.

Prior art bicycles have several limitations, especially when riding in a standing position, such as the following:

a. Prior art bicycles have a rigid and degenerate crank assembly, because the two cranks are attached to a common axis, which rigidly connects between the rider's legs, constituting a harsh geometrical constraint.

Thus, the rider movement (while riding in the standing position) is like compass walking, in which the legs move with limited/constrained/restrained movement of the knee joint, which increases up and down movement of the center of mass which leads to loss of energy.

b. The prior art crank/propulsion mechanism mechanically couples (through the central axis) the left and right legs of the rider, forcing the legs to move symmetrically in unison at a fixed radius. This is contrary to the natural asymmetric movement of walking or running in which the two legs of the body do not force movement upon each other. While riding on a prior art bicycle, the legs are forced to be 50% of the time in the stance phase and 50% in the swing phase.

c. The prior art crank assembly can have a safety problem if the pedals strike the ground (especially common in mountain biking). The force of the impact is transferred directly and rigidly to the bicycle frame, which can cause loss of stability and equilibrium, as well as injury.

d. A large and significant percentage of the human population has one leg longer than the other, unequal leg length (also termed leg length inequality, LLI or leg length discrepancy, LLD), ranging from minor and insignificant differences to significant gaps that can impair functioning and quality of life. Leg length difference is due to various reasons, such as genetics (congenital defect), poor development, injury and others. Prior art pedal mechanism and bicycles cannot compensate for this asymmetry.

e. Prior art bicycle shock absorbers allow preset of only two states: ON-OFF. There is inevitable energy loss during movement of the shock absorber mechanisms.

f. Prior art bicycle indicator and measurement systems (for measuring various parameters, such as, power, energy, etc.) are complicated due to the multitude of factors related to the bicycle geometry that simultaneously affect the measurements, such as twisting, stretching, bending, etc. of the crank arms, pedals and other factors during the course of pedaling. As a result, the prior art measuring systems can be complex and expensive, and difficult for the rider to install.

SUMMARY OF THE INVENTION

The present invention seeks to provide a pedal assembly for a bicycle, which has an auxiliary crank arm and other features, such as adjustable length, a pedal tilt limiter, shock absorber, measurement devices and other features, as is described more in detail hereinbelow.

The new auxiliary crank enables the rider to accelerate its legs while being in the administrative phase (swing), and by that to break/reduce the geometrical constraint, forcing symmetric movement of the legs.

The system is particularly useful for riding in a standing position, since it more closely mimics the natural movement of a human while walking or running. Due to the auxiliary (extended) crank arm, there is a reduced dependency between the left and right legs, in contradiction to the prior art cycling movement, in which the left and right legs are forced to move together. The auxiliary (extended) crank arm acts as a "fibula rod" and provides a type of "knee joint" for the bicycle crank arm. This eliminates the "compass" gait of the standing rider—the riders' movements are closer to natural as if walking or running.

The innovative pedaling system with its auxiliary crank arm provides leg movement that is close to natural leg movement during walking or running. In the standing position, the rider's posture enables more ergonomic motion adapted to the appropriate anatomical structure of the human body, and enables more extensive combination of muscle groups.

The system preserves the benefits of both cycling and running, while at the same time significantly reduces some of the disadvantages of running and prior art cycling, such as improved shock absorption and reduced impact on ankles and knees, as opposed to sitting while cycling, with its disadvantageous pressure and shocks.

Because of the auxiliary, freely pivoting crank arm, the left leg movement is less independent of the right leg movement. The result is natural leg movement exactly like walking or running. In addition, the leg movement is not constrained to a circular motion, but can be other motions, such as but not limited to, semi-elliptical.

In another aspect, there is provided an eccentric crank axle for independently adjust the length of the left and right crank arms. This solves the problem of riders with unequal leg length, and yet both left and right crank arms have an identical structure, thereby reducing manufacturing and inventory costs. This also avoids a situation of asymmetric weight/load due to different crank design. Contrary to prior art pedal systems that have an eccentric crank mechanism on the single, main crank, the eccentric mechanism of the present invention is applied to the extended crank, thereby not affecting the main crank overall length. Thus, the lever arm length, which determines the amount of torque, remains constant for any given position of the eccentric mechanism.

In another aspect, there is provided a pedal tilt limiter (also referred to as a rotational limiter), as described further below. In prior art pedal-crank arms, there is 360° rotational movement of the pedals. in the present invention, due to the additional crank arm, there is no necessity for a full rotational movement of the pedals, and instead the pedal rotation can be limited to a minor tilt.

In yet another aspect, there is provided a shock absorber, as described further below. In another aspect, the pedal may be assembled rigidly in a constant position relative to the crank arm.

An additional joint/axle (degree of freedom) may be added between the pedal and crank, so that the pedal can be folded. This joint may better absorb any shock created by a pedal-ground clash.

Power measurement sensors (or other sensors) may be installed on the extended crank arm, such as in a recess formed in the crank arm. In this position, the sensors can measure pure tensile forces in the crank arm without "noise" from moments, bending forces and other factors from the rest of the frame or pedals. The extending arms undergo only bending forces. For example, without limitation, the sensors may measure the power exerted by each leg as a function of angle, and the overall power during cycling. The sensors may include an angular position sensor or other sensors.

In another aspect, there is provided a modified geometry of a standard bicycle frame. First, in order to overcome the auxiliary crank length, the bottom bracket position may be elevated. For example, the bottom bracket position may be elevated above the center of the rear wheel. As a result of the elevation of the bottom bracket, additional modifications are possible, such as but not limited to, modified lengths of the seat stay, chain stay, or a larger chain ring/sprocket, which can provide increased torque and permit increasing the diameter of the smallest gear on the rear gear set, thereby increasing reliability, strength and lifetime of the rear gear set. The invention may be used not just for outdoor bicycles, but for any foot propulsion mechanism, such as but not limited to, indoor and exercise bicycles, and other riding machines, such as tricycles, elliptic riding machines and others. The term "bicycle" as used throughout the specification and claims encompasses all such foot propulsion mechanisms, riding and exercise machines, which have crank arms.

The new crank arm increases the Q-factor (distance between pedals' base/pivot). This enables using a new main crank arm that has a flat/straight geometry, without having to be bent in order to gain higher Q-factor.

A bearing can be mounted within the main crank shaft, instead of being positioned on the pedal. The bearing for the auxiliary crank arm may be mounted on the main crank shaft. The auxiliary crank arm may be shorter and wider without comprising the cycling advantages of the auxiliary crank arm that are described herein.

BRIEF DESCRIPTION OF THE DRAWINGS

The present invention will be understood and appreciated more fully from the following detailed description taken in conjunction with the drawings in which:

FIGS. 2A, 2B and 2C are simplified pictorial, plan view and sectional illustrations, respectively, of the auxiliary crank arm in accordance with a non-limiting embodiment of the invention, FIG. 2C being taken along lines C-C in FIG. 2B;

FIG. 4I is a simplified illustration of riding on an inclined surface with a bicycle equipped with the auxiliary crank arm, showing that the rider's legs are not forced to be closer to the torso and there is no restriction on the leg movement;

FIGS. 6A-6D are simplified illustrations of an adjustment member for adjusting the effective distance (length) of the auxiliary crank arm to the pedal, in accordance with a non-limiting embodiment of the invention, wherein FIG. 6A is an overall view of the adjustment member, auxiliary crank arm and pedal, FIG. 6B is a pictorial illustration of the adjustment member, which is a ball bearing race eccentrically located in a bearing housing. FIG. 6C illustrates the bearing housing mounted to the auxiliary crank arm, and FIG. 6D is a partially cutaway illustration of the bearing housing mounted to the auxiliary crank arm;

FIGS. 9A-9C are simplified illustrations of the auxiliary crank arm (in FIG. 9A, attached to the chain ring axis, in FIG. 9B by itself and in FIG. 9C showing a top view mounted in the bicycle frame), showing how the auxiliary crank arm helps increase the Q-factor while using an unbent crank arm, in accordance with an embodiment of the invention;

FIG. 10 is a simplified illustration of the bicycle pedal assembly used on an exercise bicycle, in accordance with a non-limiting embodiment of the invention;

FIGS. 11A and 11B are simplified illustrations of a bicycle frame, respectively of the prior art and of an embodiment of the invention, showing that the bicycle pedal assembly can be used to elevate the bottom bracket, and also shorten the chain stay and increase the height of the chain ring from the ground;

DETAILED DESCRIPTION OF EMBODIMENTS

Figure 1:
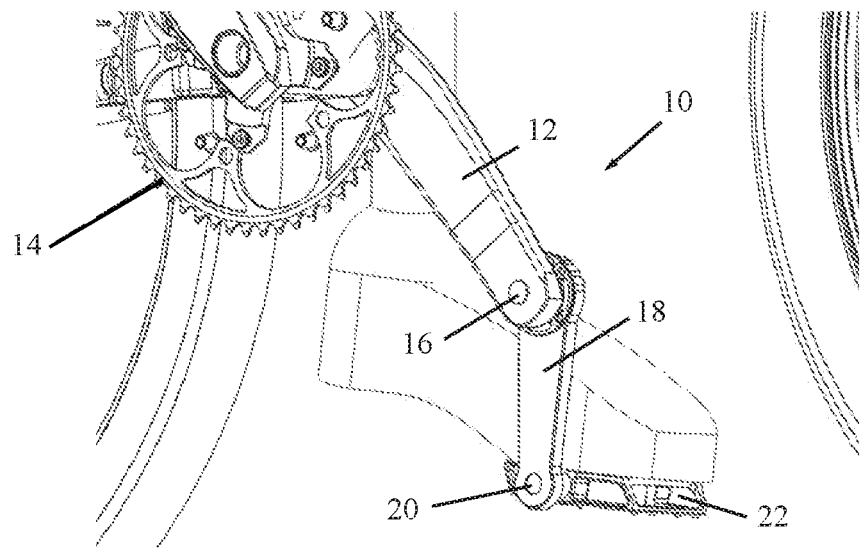
FIGS. 1 and 2 are simplified illustrations of a bicycle pedal assembly including an auxiliary crank arm connected to a pedal, constructed and operative in accordance with a non-limiting embodiment of the invention.
Figure 2:
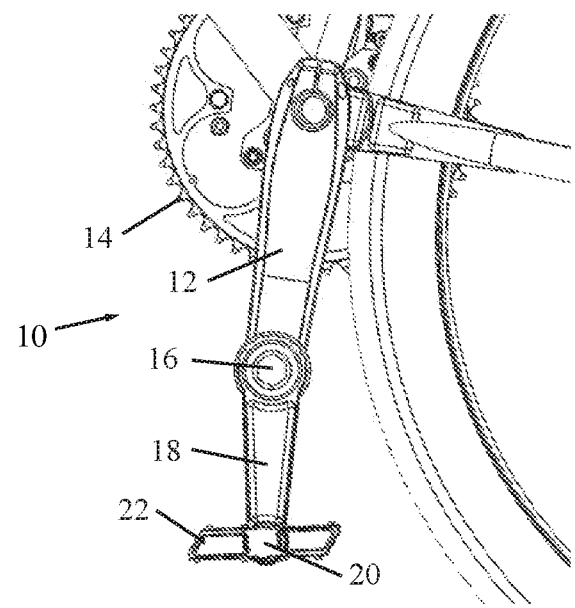

Reference is now made to FIGS. 1 and 2, which illustrate a bicycle pedal assembly 10, constructed and operative in accordance with a non-limiting embodiment of the invention.

Bicycle pedal assembly 10 includes a crank arm 12, one end of which is pivotally connected to the axle of a chain ring 14 and another end of which is pivotally connected to a first pivot 16 at one end of an auxiliary crank arm 18. In this embodiment, a pedal 22 is pivotally connected to a second pivot 20 (opposite to first pivot 16) of auxiliary crank arm 18. In other embodiments, the pedal may be rigidly connected to the auxiliary crank arm.

In FIGS. 1 and 2, auxiliary crank arm 18 is shown constructed with smooth surfaces. However, auxiliary crank arm 18 may be constructed with one or more recesses, which provide further advantages and features, as is described further below with reference to FIGS. 7A and 7D.

Reference is now made to FIGS. 2A-2C, which illustrate one possible construction of the auxiliary crank arm 18. Auxiliary crank arm 18 may include an enlarged end 13 and a narrower end 15, each formed with a mounting hole 17A and 17B, respectively. The width of auxiliary crank arm 18 may gradually increase by an angle A from narrower end 15 to enlarged end 13. Angle A, without limitation, may be in the range of 2-10°. The narrower end 15 may be rounded with a diameter D and width W and enlarged end 13 may be rounded with a radius R. Auxiliary crank arm 18 may be formed with a longitudinal recess 19A in its middle portion. As seen in FIG. 2C, auxiliary crank arm 18 may also be formed with recesses 19B and 19C on leading and trailing surfaces. Due to the recesses 19B and 19C, auxiliary crank arm 18 has a cross-sectional H shape closer to the enlarged end 13 and to the narrower end 15 (away from longitudinal recess 19A). The cross-sectional H shape closer to the enlarged end 13 provides auxiliary crank arm 18 with a strong resistance to bending due to the relatively large moment of inertia, while at the same time reducing weight due to the cutout portions of the H profile.

In another embodiment, the auxiliary crank arm 18 may be constructed with internal recesses, that is, recesses inside the arm not visible from the outside of the arm.

Figure 2D:
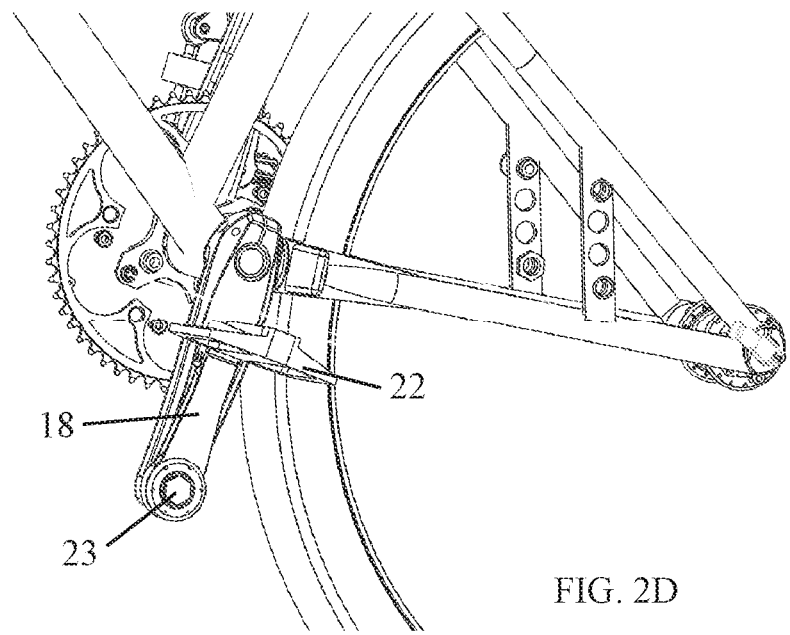
FIGS. 2D and 2E are simplified illustrations of a folding pedal in accordance with a non-limiting embodiment of the invention.
Figure 2E:
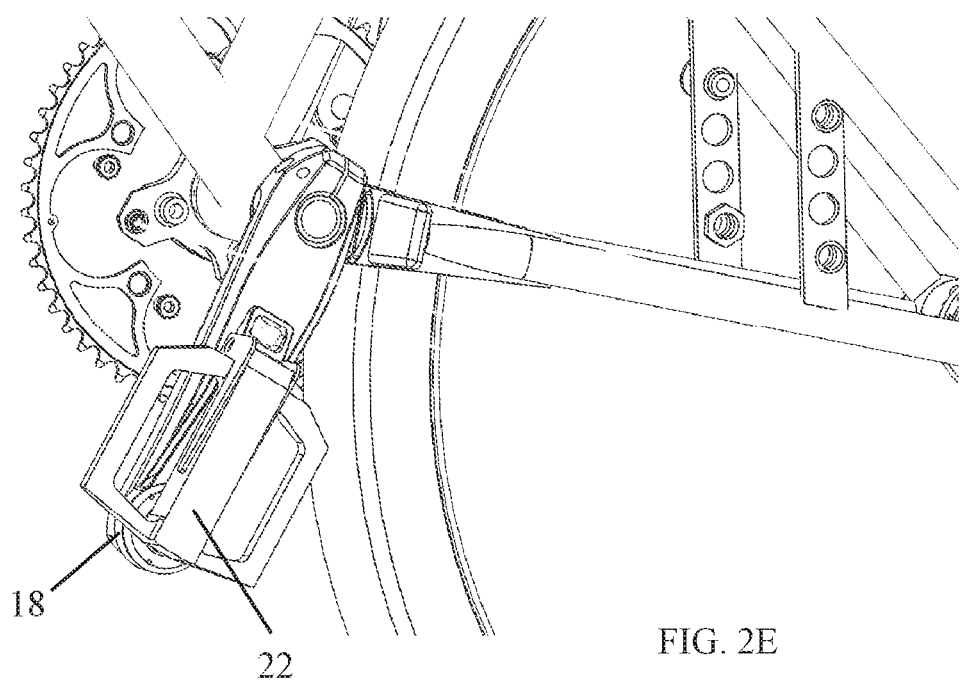

Reference is now made to FIGS. 2D and 2E, which illustrate that pedal 22 may be a folding pedal. Pedal 22 may be attached to auxiliary crank arm 18 with a pivoting mechanism 23 that permits folding pedal 22 along any suitable pivot axis, such as folding pedal 22 up and towards auxiliary crank arm 18.

The auxiliary crank arm 18 may be constructed of any suitable material as with prior art crank arms (or with materials not normally used for crank arms), such as but not limited to, any suitable metal (e.g., stainless steel, aluminum alloy, titanium alloy and others) or composite materials or a combination thereof, and may be made by any suitable method, such as but not limited to, forging, casting, machining, metal injection molding (MIM) and others. The left and right auxiliary crank arms 18 (as well as crank arms 12) may have identical structure, thereby reducing manufacturing and inventory costs.

Because of the auxiliary, freely pivoting crank arm 18, the left leg movement is independent of the right leg movement. The result is natural leg movement exactly or nearly like walking or running. In addition, in contrast to the prior art, the leg movement is not constrained to a circular motion, as is explained now with reference to FIGS. 3 and 4A-4H.

Figure 3:
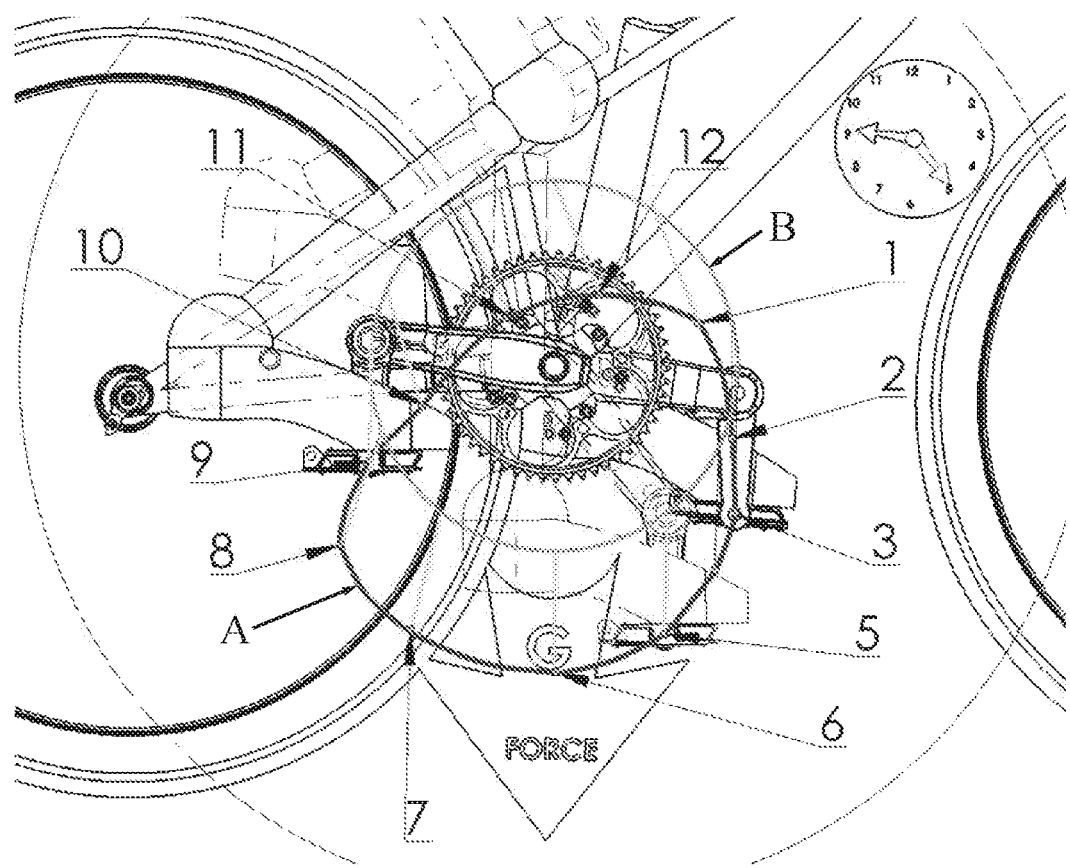
FIG. 3 is a simplified illustration of the path travelled by the pedal using the auxiliary crank arm of the present invention as opposed to the path travelled by a prior art pedal without the auxiliary crank arm.

FIG. 3 illustrates the path (designated by reference letter A) travelled by the pedal 22 (at second pivot 20) using the auxiliary crank arm 18 as opposed to the path (designated by reference letter B) travelled by the pedal 22 (which would be placed at first pivot 16) with the prior art crank arm (similar to crank arm 12) without using the auxiliary crank arm 18. The path B is a circular path—the pedal at first pivot 16 travels at a constant radius around the axle of the chain ring 14. However, in path A, there is no constant radius; the pedal goes further down due to the added length of the auxiliary crank arm 18 but remains low in the upper part of the travel due to the pivoting of the pedal 22 about second pivot 20.

Figure 4A:
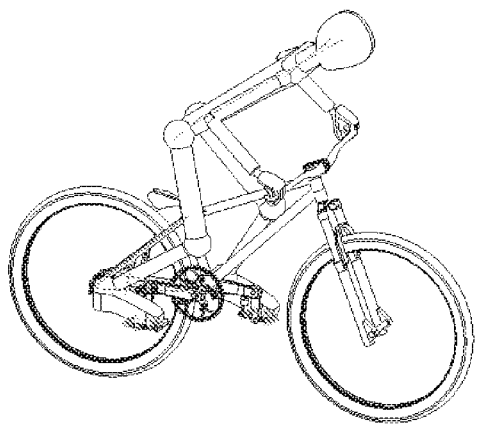
FIGS. 4A-4H are simplified illustrations of different angular positions of the pedal and auxiliary crank arm during pedaling, wherein in FIG. 4A the rider's right foot is at the 9 o'clock position, in FIG. 4B the rider's right foot is at the 10 o'clock position, in FIG. 4C the rider's right foot is at the 12 o'clock position, in FIG. 4D the rider's right foot is at the 2 o'clock position, in FIG. 4E the rider's right foot is at the 3 o'clock position, in FIG. 4F, the rider's right foot is at the 4 o'clock position, in FIG. 4G, the rider's right foot is at the 6 o'clock position, and in FIG. 4H, the rider's right foot is at the 7-8 o'clock position.

Reference is now made to FIGS. 4A-4H. In FIG. 4A, the rider's right foot is at the 9 o'clock position. This is a neutral position in which the rider is standing passively just prior to pushing with the left foot down on the left pedal, in contrast to the active situation, in which the auxiliary crank is tilted back.

Figure 4B:
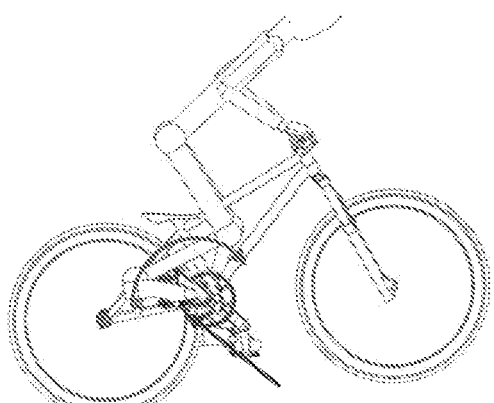

In FIG. 4B, the rider's right foot is at the 10 o'clock position. In this position, the rider commences acceleration, in which the right foot starts to move forward in order to regenerate thrust. There is almost no load on the right foot. On the other hand, the left foot creates a downward thrust. The mechanism of the invention simulates natural knee movement without resistance from one side of the body to the other. The rider does not need to compensate for forced linkage between the left and right legs as in the prior art, which forces the rider's body to move up and down.

Figure 4C:
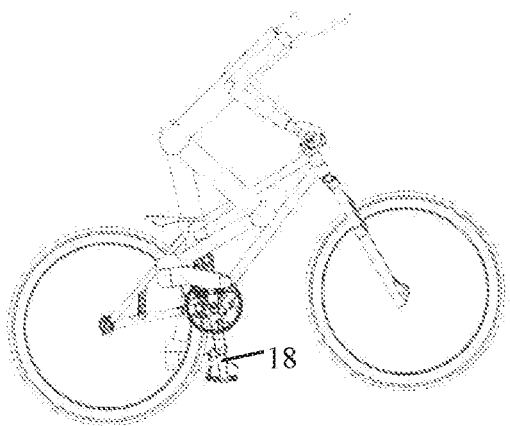

In FIG. 4C, the rider's right foot is at the 12 o'clock position. This position, in the prior art, is top dead center with no creation of torque. In contrast, in the present invention, in the 12 o'clock position the rider does create some torque due to the auxiliary crank arm 18 allowing somewhat horizontal movement of the right foot past the top dead position.

Figure 4D:
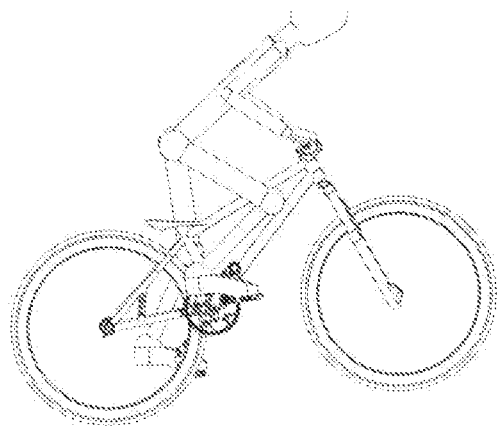

In FIG. 4D, the rider's right foot is at the 2 o'clock position. In this position, the right foot creates a downward thrust and the left foot almost effortlessly moves backward and contributes to the acceleration.

Figure 4E:
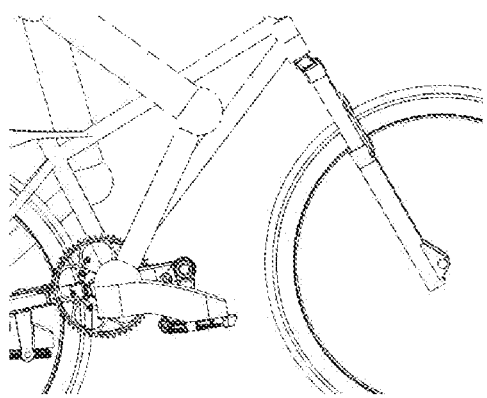

In FIG. 4E, the rider's right foot is at the 3 o'clock position, in which continued movement produces further torque.

Figure 4F:
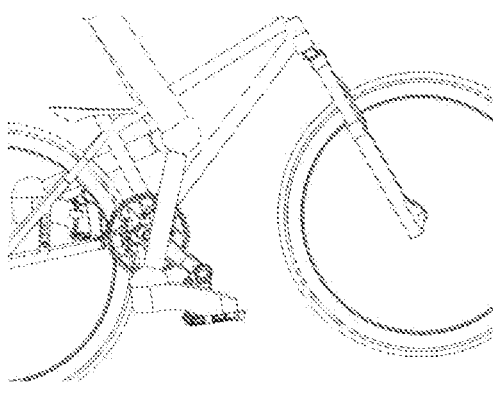

In FIG. 4F, the rider's right foot is at the 4 o'clock position, in which continued movement produces further torque and mimics the knee angle of a runner or walker's leg when about to touch the ground.

Figure 4G:
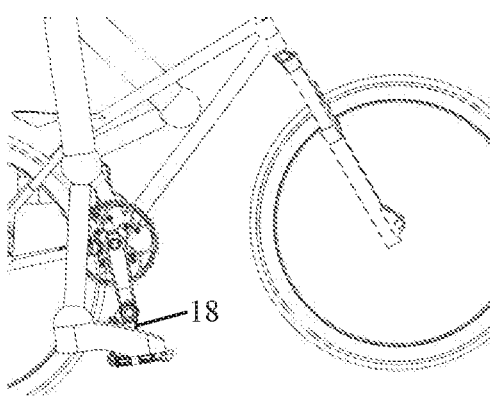

In FIG. 4G, the rider's right foot is at the 6 o'clock position, whereas the left foot is at the 12 o'clock position. This position for the left foot, in the prior art, is top dead center with no creation of torque, as mentioned above for FIG. 4C. In contrast, in the present invention, in the 12 o'clock position the rider does create some torque due to the auxiliary crank arm 18 allowing somewhat horizontal movement of the left foot through the top dead position.

Figure 4H:
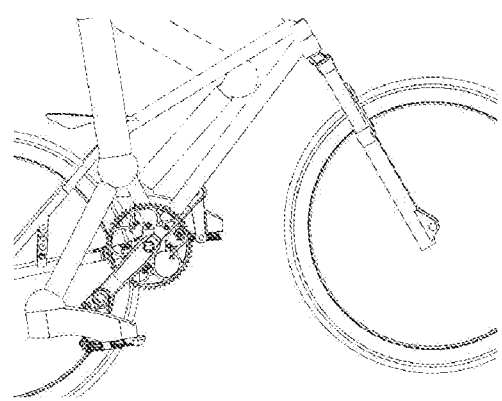
Figure 41:
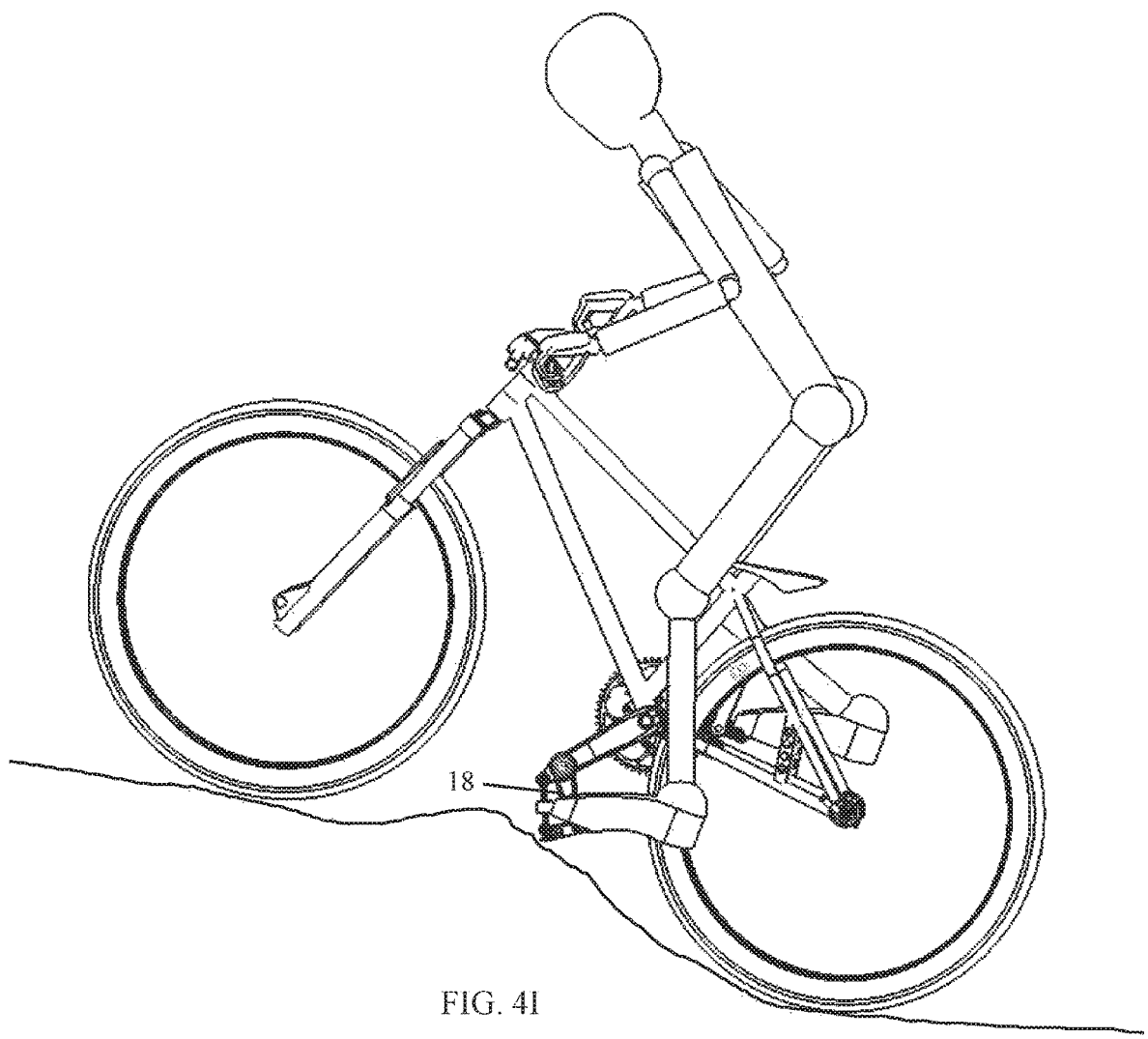

In FIG. 4H, the rider's right foot is at the 7-8 o'clock position, whereas the left foot is at the 1-2 o'clock position. The left foot creates a downward thrust and the right foot almost effortlessly moves backward and contributes to the acceleration.

Figure 5A:
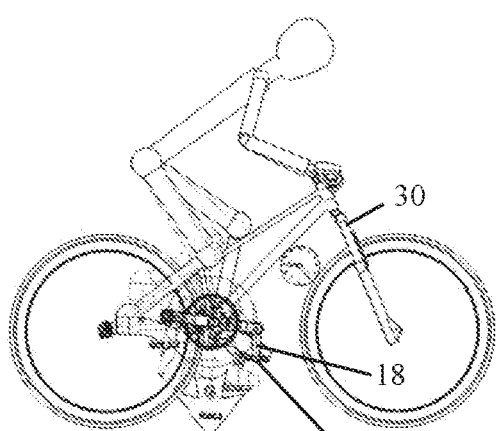
FIGS. 5A-5B are simplified illustrations of riding a bicycle equipped with the auxiliary crank arm on level and inclined surfaces, respectively.
Figure 5B:
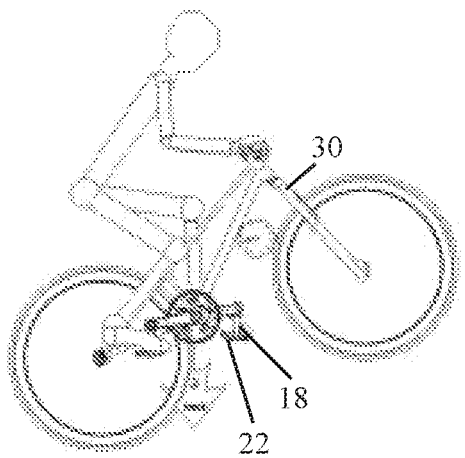
Figure 6A:
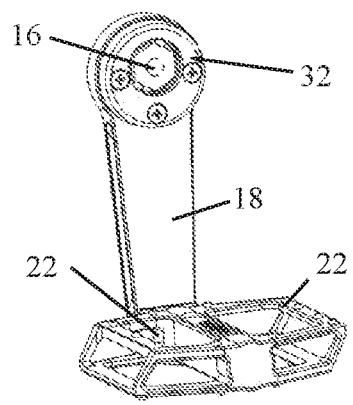
Figure 6B:
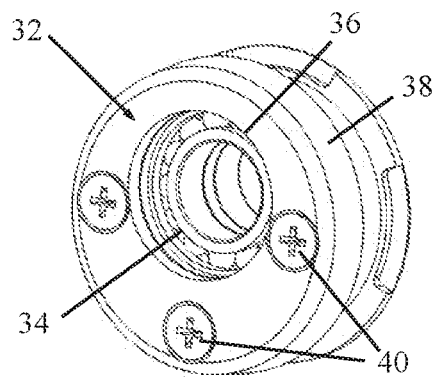
Figure 6C:
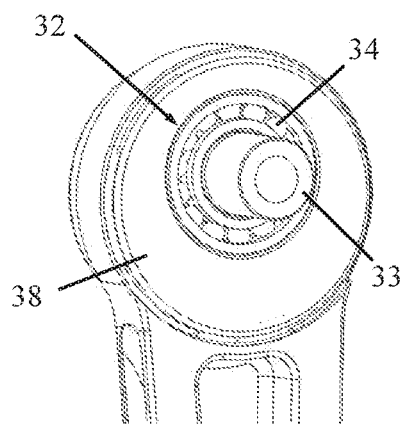
Figure 6D:
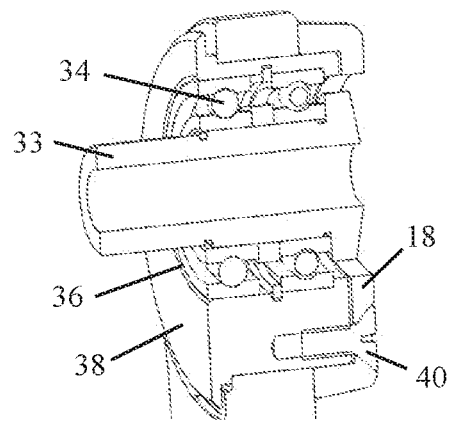

Reference is now made to FIGS. 5A-5B, which illustrate riding a bicycle 30 equipped with the auxiliary crank arm 18 on level and inclined surfaces, respectively. Due to the free pivoting of the pedals 22 about the auxiliary crank arm 18, in both the level and inclined positions, the auxiliary crank 18 remains aligned with the gravity force vector. This has the advantageous effect of maintaining the rider's knees and ankles at the optimum orientation with respect to the rider's center of gravity for better powering up a hill as opposed to prior art bicycles with no auxiliary crank arm.

While riding on an inclined surface, the rider leans forward in order to avoid sliding back. In prior art bicycles, this situation forces the rider's legs to be closer to the torso, limiting its movement. In contrast, as seen in FIG. 5C, in the present invention with the auxiliary crank arm 18, while riding on an inclined surface, the rider's legs are not forced to be closer to the torso and there is no restriction on the leg movement.

As mentioned above, a large and significant percentage of the human population has one leg longer than the other, ranging from minor and insignificant differences to significant gaps that can impair functioning and quality of life. The invention provides a solution to this problem as is now described.

Reference is now made to FIGS. 6A-6D, which illustrate an adjustment member for adjusting the length of auxiliary crank arm 18 to the pedal 22. By keeping the length of the main crank arm constant, the torque generated by both legs is equal, even though the left and right auxiliary cranks have different lengths. Prior art cranks that have an eccentric mechanism in the single main crank arm have a disadvantage of the left crank length being different than the right crank length, which results in a non-symmetric torque mechanism.

In one non-limiting embodiment, the auxiliary crank length adjustment is accomplished by means of an eccentric crank axle 32 positioned at first pivot 16. The eccentric crank axle 32 includes a ball bearing race 34 mounted in an aperture 36 formed in a cylindrical bearing housing 38. It is noted that aperture 36 is not formed at the center of bearing housing 38; rather it is positioned off-center to the central axis of bearing housing 38. Bearing housing 38 may be secured to the end of auxiliary crank arm 18 by fasteners 40 (such as three screws, for example). The effective length of auxiliary crank arm 18 may be adjusted by removing fasteners 40 and turning the bearing housing 38 to a different angular orientation and re-tightening the fasteners 40. The new angular orientation changes the off-center position of aperture 36 and of ball bearing race 34, either moving them closer to or further away from the second pivot 20 and pedal 22. (FIGS. 6C and 6D also show the axle 33 of the chain ring mounted in ball bearing race 34.) In this manner, the invention allows for independently adjusting the length of the left and right crank arms. This solves the problem of riders with unequal leg length, and yet both left and right crank arms have an identical structure/characteristics, thereby reducing manufacturing and inventory costs.

Other adjustment members may be used, such as but not limited to, an auxiliary crank arm with an extensible length (e.g., telescopic arm with locking capability, such as a ratchet mechanism).

Reference is now made to FIGS. 7A-7D, which illustrate a pedal tilt limiter that may also serve as a shock absorber, in accordance with four different non-limiting embodiments of the invention.

Figure 7A:
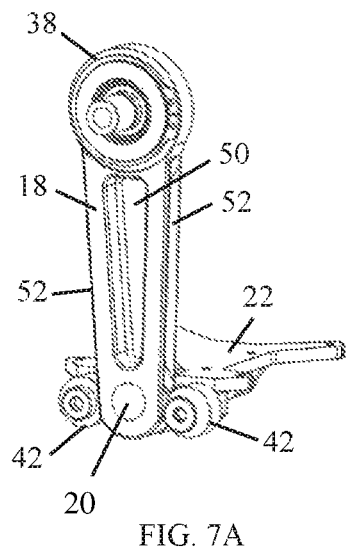
FIGS. 7A-7D are simplified illustrations of a pedal tilt limiter and of a shock absorber, in accordance with four different non-limiting embodiments of the invention.

Referring to FIG. 7A, a pedal tilt limiter 42 is provided between pedal 22 and the end of auxiliary crank arm 18. The pedal tilt limiter 42 may be one or more elastomeric members, such as but not limited to, cylinders, posts, rods, grommets, bumpers and the like that limit the tilt of pedal 22 about the axis of second pivot 20. By making pedal tilt limiter 42 of an elastomeric material, the pedal tilt limiter 42 is also a shock absorber, which may dampen shocks transmitted to the rider's foot. In the illustrated embodiment, there are two pedal tilt limiters 42, mounted on opposite sides of the auxiliary crank arm 18 and the axis of second pivot 20 underneath the pedal 22. It may limit one side only, or both sides. It may be adjustable. The pedal may be also totally fixed, having no ability to move around the second pivot 20.

Figure 7B:
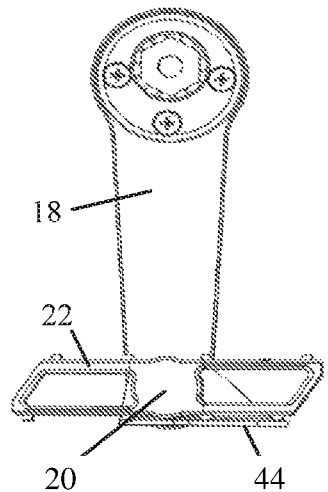
Figure 7C:
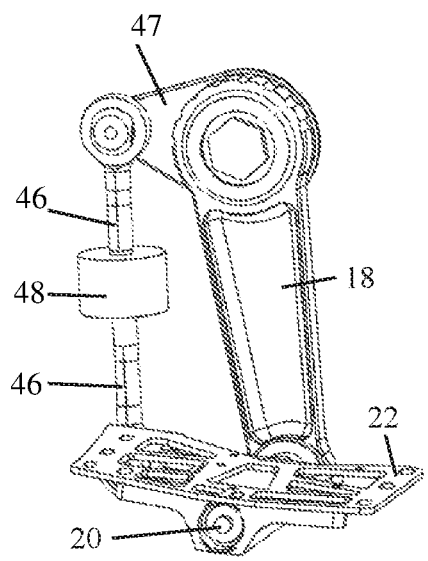
Figure 7D:
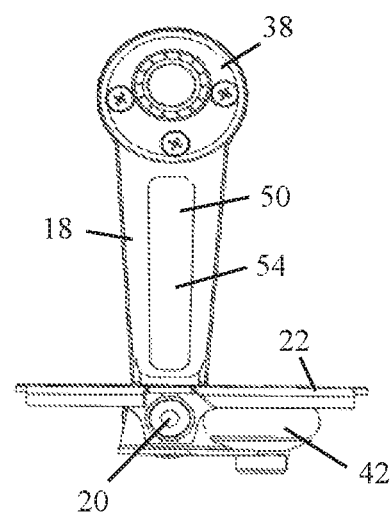

Alternatively, as shown in FIG. 7D, there is just one pedal tilt limiter 42, mounted on one side of auxiliary crank arm 18 and one side of the axis of second pivot 20 underneath the pedal 22. In such an embodiment, the pedal tilt limiter 42 may be mounted on the side corresponding to the rear of the rider's foot and not mounted on the side corresponding to the front of the rider's foot. In this manner, the pedal tilt limiter 42 may help cushion forces against the rear of the rider's foot when the rider is approaching a downhill descent or going over obstacles (the arrow pointing down on the right side of the pedal in FIG. 7D), but permits the full force of the rider's foot (with no dampening) when pressing with the front of the foot when propelling (the arrow pointing down on the left side of the pedal in FIG. 7D).

Referring to FIG. 7B, a pedal tilt limiter 44 is provided at the bottom of auxiliary crank arm 18 underneath pedal 22. The pedal tilt limiter 44 may be one or more elastomeric members, such as but not limited to, pads or sheets and the like that limit the tilt of pedal 22 about the axis of second pivot 20.

Referring to FIG. 7C, a pedal tilt limiter 46 is provided which is a rod, one end of which is connected to pedal 22 and the other end of which is connected to a flange 47 connected to bearing housing 38. The pedal tilt limiter 46 may include a shock absorber 48, which may be a cushion mounted between upper and lower rods that make up the full rod of limiter 46. Here again, there is just one pedal tilt limiter 46, mounted on one side of auxiliary crank arm 18 and one side of the axis of second pivot 20. Alternatively, two pedal tilt limiters 46 may be provided, which are mounted on opposite sides of auxiliary crank arm 18 and the axis of second pivot 20.

Referring to FIGS. 7A and 7D, it is seen that auxiliary crank arm 18 may be constructed with one or more recesses, such as a recess 50 formed on the outer face of auxiliary crank arm 18 (alternatively or additionally on the inner face of auxiliary crank arm 18) and/or a recess 52 formed on the leading (front) and/or trailing (rear) face of auxiliary crank arm 18. It is noted that auxiliary crank arm 18 is relatively wide near its upper end at the bearing housing 38 and gradually tapers to be relatively narrow near its lower end at the pedal 22. The extra width is at the upper end because that area is required to bear much more force and torque than the lower end. Similarly, recess 50 may be relatively wide near its upper end and may gradually taper to be relatively narrow near its lower end.

The recesses may be used to save on weight. The recesses may also be used to mount therein different accessories. For example, in one embodiment (shown in FIG. 7D), a reflector 54 (e.g., light or reflective tape and the like) may be disposed in one or more of the recesses, which makes the rider more visible. In another example, sensors may be mounted in the recesses (recesses 19A, 19B and/or 19C of FIGS. 2A-2C or other recesses), as is now described. Other optional reflectors may be positioned in other places on the auxiliary crank arm and not in a recess. Recesses may be used for various purposes, such as to accommodate any electrical devices/circuits.

Figure 8A:
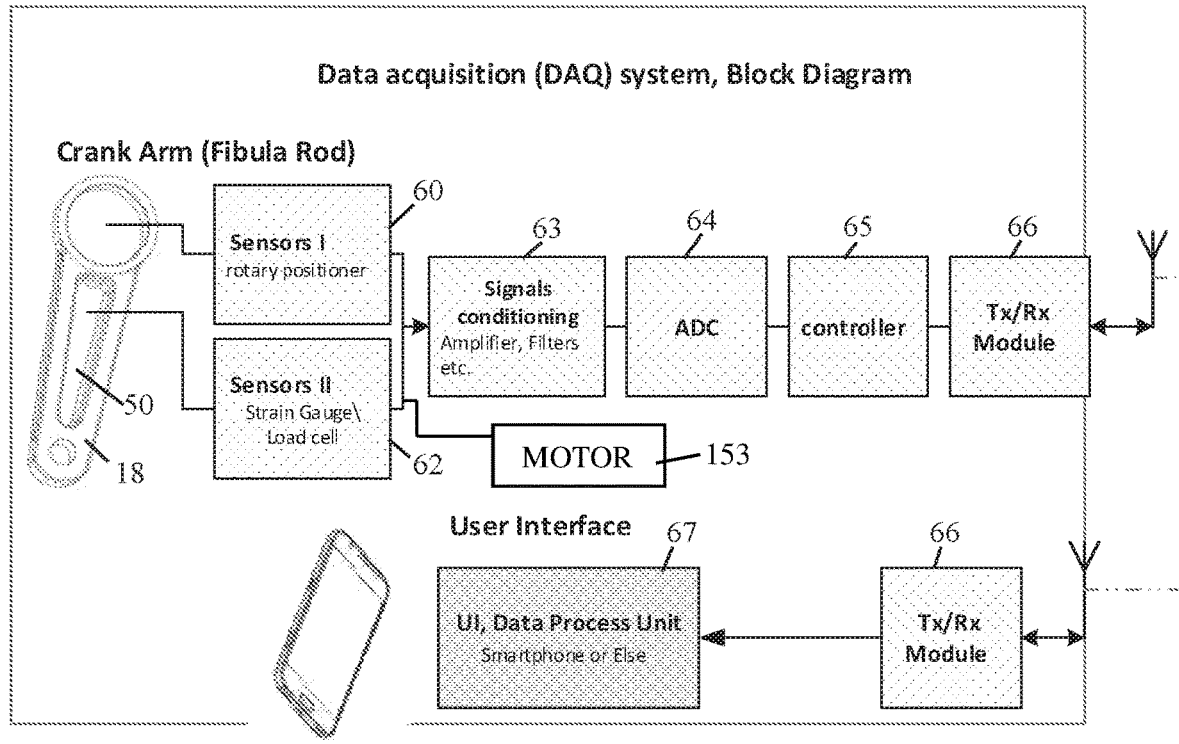
FIGS. 8A-8B are simplified block diagrams of measurement apparatus for sensing and monitoring different parameters associated with using the crank arm of the invention, such as power, energy, etc., in accordance with a non-limiting embodiment of the invention.
Figure 8B:
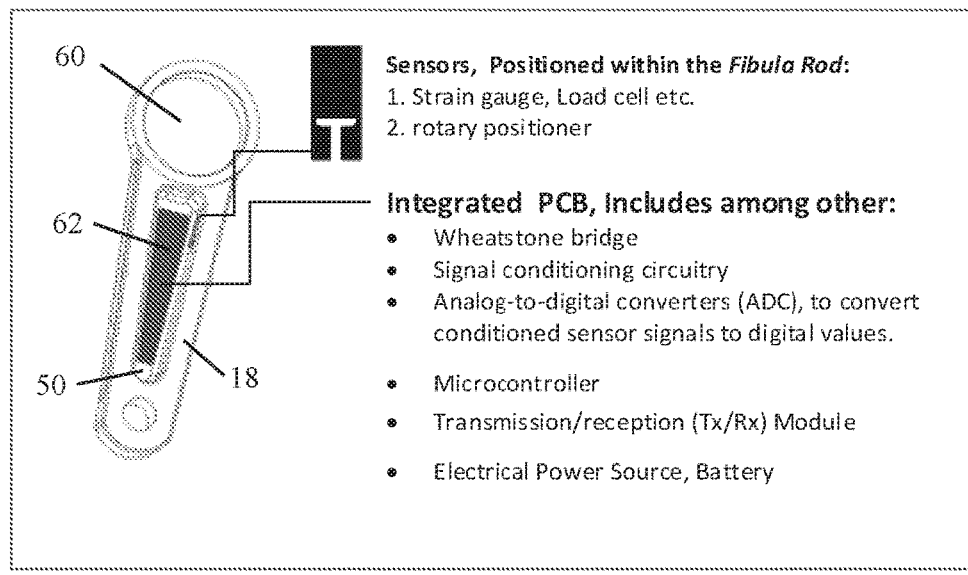

Reference is now made to FIGS. 8A-8B, which illustrate block diagrams of measurement apparatus for sensing different parameters associated with using the crank arm of the invention.

The measurement apparatus may include, without limitation, a rotary position sensor 60 (e.g., a shaft encoder) mounted at the upper end of auxiliary crank arm 18, and a force sensor 62 (e.g., a load cell, strain gauge) mounted in recess 50. The sensors may be in communication with a processor, which may include, without limitation, signal conditioning elements 63 (e.g., amplifier, filters, etc.), an analog to digital converter (ADC) 64, a controller 65 and transceiver 66. The transceiver 66 may communicate with a user interface 67, such as a personal communication device and the like. Alternatively or additionally, as shown in FIG. 8B, the sensor can include components on an integrated printed circuit board, such as but not limited to, a Wheatstone bridge, signal conditioning circuitry, ADC, controller, transceiver, battery, and other components.

Figure 13:
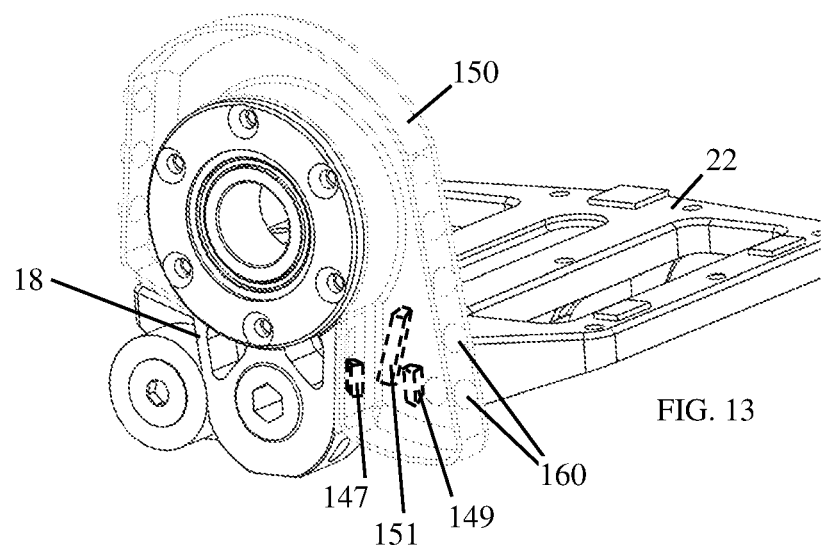
FIG. 13 is a simplified illustration of lights and other electrical components coupled to the auxiliary crank arm, in accordance with a non-limiting embodiment of the invention.

FIG. 13 illustrates another example of the rotational sensor, which may be a strain gauge sensor 147 and/or Hall effect sensor 149 and others, mounted in a housing 150 attached to auxiliary crank arm 18. These sensors may be in communication with a processor 151 for generating electricity to an electric motor 153 (FIG. 8A) for aiding propulsion of the bicycle (in the case of an electric bicycle). (Alternatively, processor 151 may be an electric generator itself, e.g., a reciprocating device that generates electricity by swinging motion.) If the rotational sensor senses forward tilt of pedal 22, the electric motor aids in forward propulsion of the bicycle; conversely, if the rotational sensor senses rearward tilt of pedal 22, the electric motor does not aid in forward propulsion of the bicycle (e.g., the electric motor may either shut down or may instead generate electricity operating as an alternator or electric generator but disconnected from propelling the bicycle).

FIG. 13 also illustrates one or more reflectors or lights 160 (e.g., LED) coupled to auxiliary crank arm 18 (e.g., mounted on the leading or trailing surface of housing 150). The reflector or light 160 reflects or emits light in a direction towards a leading or a trailing face of auxiliary crank arm 18. The advantage is that, due to the auxiliary crank arm, the reflector or light 160 always faces in this direction throughout rotation of the main crank when riding the bicycle.

In contrast with prior art measurement systems, which must handle variable amounts of mechanical forces that are different in each part of the rotation (such as twisting, stretching and bending), the auxiliary crank arm of the invention has much more uniform forces over the course of the leg rotation, at least in part due to the fact that the rider's posture is maintained quite uniformly in relation to the vector of gravity and the pedal.

The structural design of the auxiliary crank arm allows mounting sensors whose output is monitored by an electronic control unit that can transfer data to a centralized data processing unit wirelessly (wireless communication). The data can then be analyzed and stored. The sensors can be used to compare performance parameters of the left and right legs of the rider, for purposes such as to analyze different leg length and the like Reference is now made to FIGS. 9A-9C are simplified illustrations of the auxiliary crank arm, and particularly to FIG. 9C, which shows how the auxiliary crank arm 18 helps increase Q factor, in accordance with an embodiment of the invention.

Q factor is the distance between the outside of one crank arm to the outside of the opposite crank arm. A similar term, stance width, is the distance between feet on the pedals.

In general, in the prior art, the crank arm is designed to create a distance between the plane of leg and pedal movement and the plane of the bicycle frame (e.g., 20 mm). To achieve this goal, the single crank arm is bent outwards to prevent the rider's feet from colliding with parts of the bicycle frame. The outward bend of the crank arm increases Q factor. A disadvantage is that the bent crank arm is weaker and is usually compensated by thickening the crank arm material or using stronger materials, both of which make the bicycle more expensive.

In contrast, in the present invention using auxiliary crank arm 18, the crank arm 12 and the auxiliary crank arm 18 do not have to be bent at all because the addition of auxiliary crank arm 18 positions the rider's foot away from any interference with parts of the bicycle frame and increases the Q-factor with an unbent crank arm.

Reference is now made to FIG. 10 is a simplified illustration of the bicycle pedal assembly 10 used on an exercise bicycle 69, in accordance with a non-limiting embodiment of the invention. This is not limiting, and the invention can be implemented in any cycling machine, such as but not limited to, exercise bikes, indoor and outdoor bicycles (mountain, road, all-terrain, dirt, etc.), elliptical machines, unicycle, training machines and many more.

Reference is now made to FIGS. 11A and 11B are simplified illustrations of a bicycle frame, respectively of the prior art and of an embodiment of the invention, showing that the bicycle pedal assembly can be used to elevate the bottom bracket, and also shorten the chain stay and increase the height of the chain ring from the ground.

The added length due to the auxiliary crank arm 18 may necessitate raising the mounting point of the main propulsion assembly, that is, the central axle of the chain ring 14 in order to prevent the auxiliary crank arm 18 from striking the ground. In one embodiment, this may be accomplished by raising the bottom bracket of the bicycle frame so that it is higher from the ground. In contrast to the prior art, the bottom bracket of the bicycle frame is higher than the center of rotation of the rear wheel of the bicycle. Because of the elevated bottom bracket of the bicycle frame, a larger diameter chain ring 14 (FIGS. 1 and 2) may be used. This has the advantage of increasing the torque generated by the propelling force of the rider's legs and has the further advantage of being able to use a larger diameter for the smallest gear of the rear gear set. This increases the strength, reliability and longevity of the gear set. Due to the elevation, the larger chain ring will remain at the same distance/gap from the ground.

Another advantage of raising the bottom bracket and chain ring is increased safety for the rider, because the larger distance from the ground means less chance of striking rocks or other objects on the ground.

Since the bottom bracket of the bicycle frame and the central axle of the chain ring 14 are raised, the length of the chain stay 70 may be shortened. Indeed even without elevating the bottom bracket of the bicycle frame, in the present invention, the length of the chain stay 70 may be shortened. Additionally the length of the seat stay 72 and seat post 74 may be shortened. The seat tube may also be shortened. These modifications to the bicycle frame may provide a better fit when riding standing up: the rider is positioned closer to the rear wheel, which may improve steerability of the bicycle. In addition, the modifications to the bicycle frame geometry may reduce the overall weight of the bicycle and yet increase the rigidity of the bicycle frame.

One of the advantages of the present invention is that it provides a novel disposable and/or replaceable bicycle pedal. The pedal itself—without any bearing or shaft—can be easily mounted on the pedal shaft, such as by clicking in place. The pedal mounts easily with a click since the pedal shaft hardly rotates if at all (there is basically only a pressing force). No tools are needed to mount the pedal. The wear is on the pedal itself, not on bearings or the shaft.

Figure 12A:
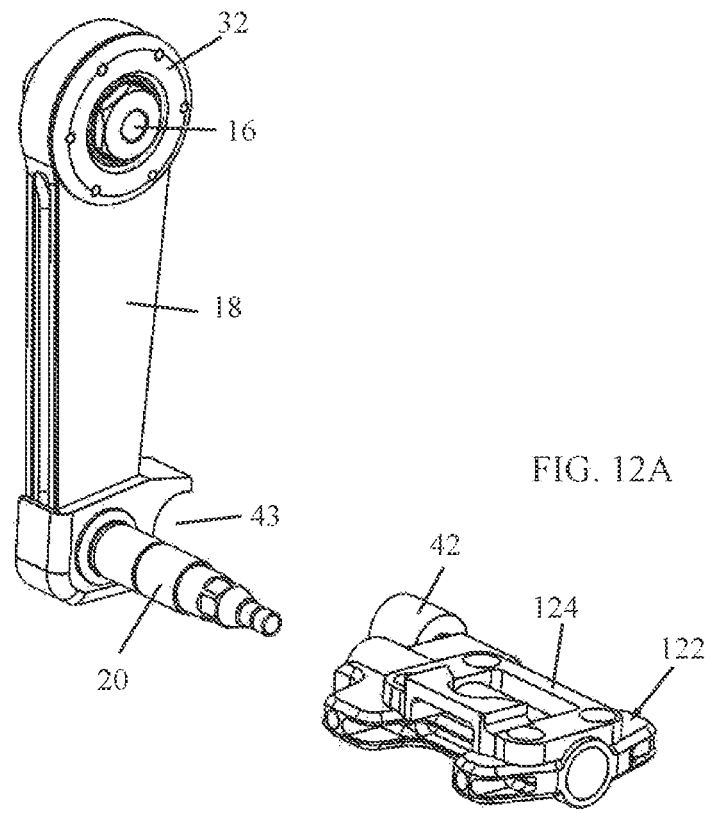
FIGS. 12A-12B are simplified illustrations of a disposable and/or replaceable bicycle pedal, in accordance with a non-limiting embodiment of the invention, respectively before and after attaching the pedal to the pedal shaft.
Figure 12B:
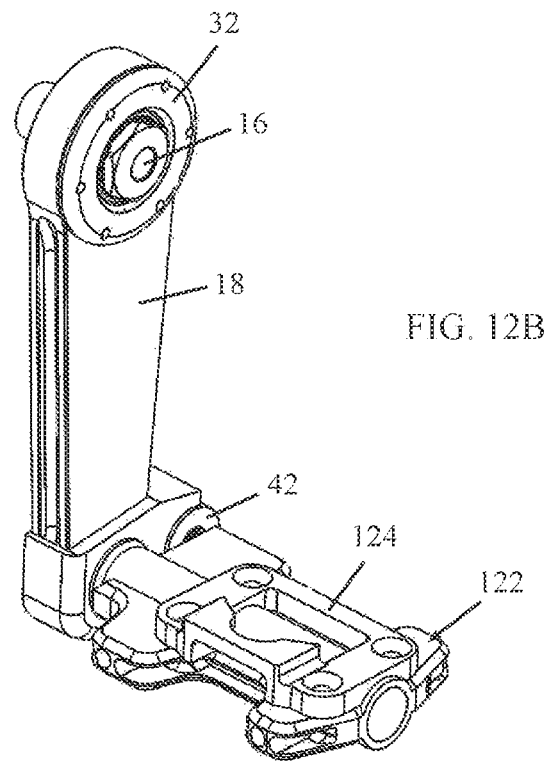

Reference is now made to FIGS. 12A-12B, which illustrate an exemplary embodiment of the disposable and/or replaceable bicycle pedal, respectively before and after attaching the pedal to the pedal shaft.

As described above with reference to FIGS. 6A and 7A, the pedal (in FIGS. 12A-12B it is called pedal 122), may be mounted on a pedal shaft which is the second pivot 20 (FIG. 12A), opposite to the first pivot 16 of the auxiliary crank arm 18. Also as before, in one non-limiting embodiment, the auxiliary crank length adjustment is accomplished by means of an eccentric crank axle 32 positioned at first pivot 16.

Pedal 122 may include a pedal tilt limiter 42, which may be one or more elastomeric members, such as but not limited to, cylinders, posts, rods, grommets, bumpers and the like that limit the tilt of pedal 122 about the axis of second pivot 20. The pedal tilt limiter 42 may be received in an arcuate recess 43 formed at a lower end of auxiliary crank arm 18. By making pedal tilt limiter 42 of an elastomeric material, the pedal tilt limiter 42 is also a shock absorber, which may dampen shocks transmitted to the rider's foot. The pedal tilt limiter 42 may limit the rotational movement of pedal 122 about second pivot 20 to very little or nothing at all.

Figure 12C:
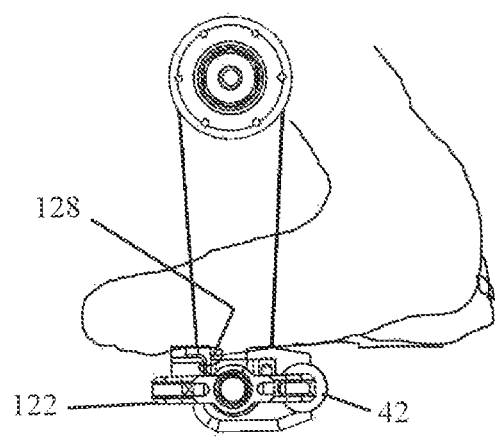
FIG. 12C is a simplified illustration of the pedal limited in rotation by pedal tilt limiters.

Referring to FIG. 12C, an additional pedal limiter 128 may be provided, such as a catch or hook 128 that snaps over a portion of the pedal and locks the pedal from tilting (together with pedal tilt limiter 42).

Figure 12D:
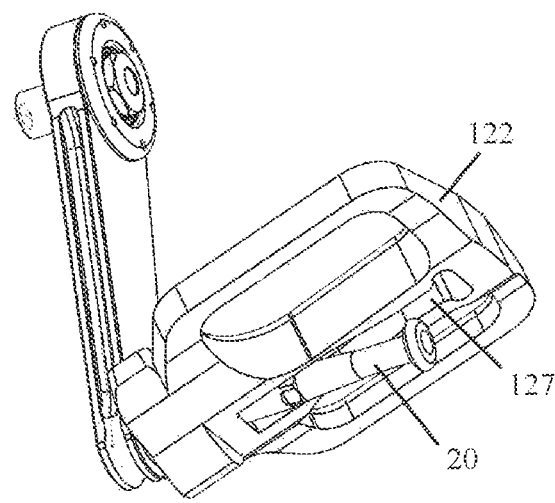
FIGS. 12D, 12E and 12F are simplified illustrations of mounting the pedal on to the pedal shaft, in accordance with a non-limiting embodiment of the invention.
Figure 12E:
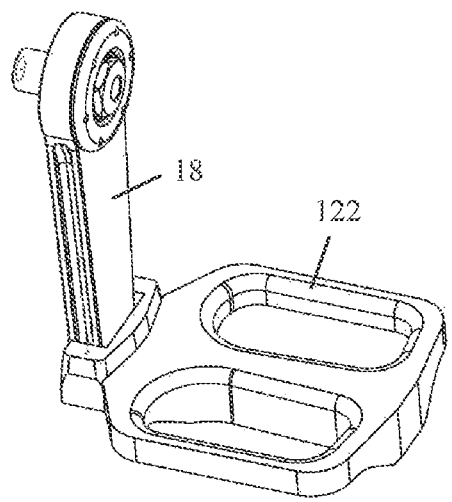
Figure 12F:
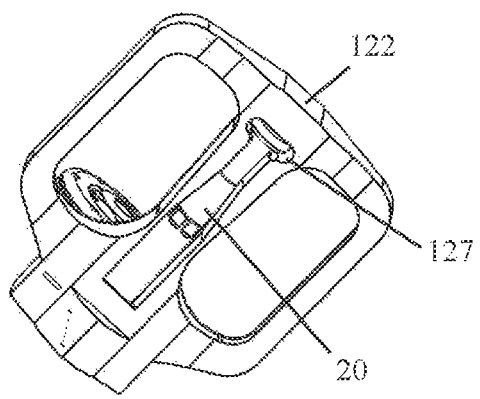

Pedal 122 may be made of a plastic material or other materials. Pedal 122 may simply click on to, or off from, the shaft (second pivot) 20, for easy assembly and disassembly. Alternatively, as shown in FIGS. 12D-12F, pedal 122 may slip over shaft 20 and shaft 20 clicks into a recess 127 formed in an underside of pedal 122.

Pedal 122 may include a foot receiving member 124, such as a platform with apertures for accepting cleats or other shoe elements.

Figure 14A:
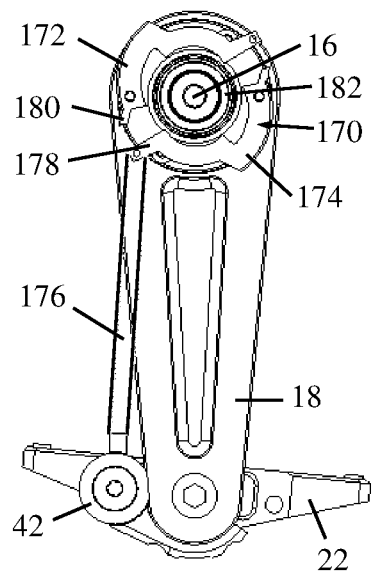
FIGS. 14A and 14B are simplified illustrations of a locking member for locking and unlocking rotation of the auxiliary crank arm about an upper pivot arm, in accordance with a non-limiting embodiment of the invention, in respective unlocked and locked orientations.
Figure 14B:
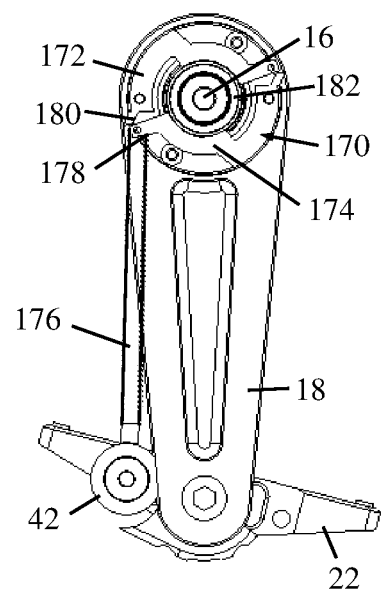

Reference is now made to FIGS. 14A and 14B, which illustrate a locking member 170 for locking and unlocking rotation of the auxiliary crank arm 18 about the first pivot 16. Without limitation, locking member 170 may include upper and lower arcuate locking arms 172 and 174 pivoted about first pivot 16. Lower arm 174 may be coupled to pedal tilt limiter 42 by a link arm 176. Lower arm 174 may be brought into locked engagement with upper arm 172 by means of a lug 178 that catches (e.g., clicks) with a tab 180 on upper arm 172. Lower arm 174 may be brought into locked engagement with upper arm 172 by suitable upward movement of link arm 176 and may be unlocked with respect to upper arm 172 by suitable downward movement of link arm 176. In the locked engagement, the upper and lower arms 172 and 174 pinch or otherwise increase friction around first pivot 16 (e.g., squeezing against an O-ring 182) so that auxiliary crank arm 18 is locked from rotating about the first pivot 16.

What is claimed is:

1. A foot propulsion mechanism comprising:
    a crank arm, one end of which is pivotally connected to a propulsion axle of a bicycle and another end of which is pivotally connected to a first pivot at one end of an auxiliary crank arm;
    a pedal connected to another end of said auxiliary crank arm, said pedal being rotatable about an axial centerline of a pedal pivot connection; and
    a pedal tilt limiter coupled to said pedal and configured to limit tilt or rotation of said pedal about said axial centerline, and wherein said pedal tilt limiter comprises a pair of pedal tilt limiters located on opposite sides of said auxiliary crank arm.

2. The foot propulsion mechanism according to claim 1, further comprising a reflector or light coupled to said auxiliary crank arm and arranged to reflect or emit light in a direction towards a leading or a trailing face of said auxiliary crank arm.

3. The foot propulsion mechanism according to claim 1, further comprising a sensor coupled to said auxiliary crank arm, said sensor comprising a force sensor, a rotational sensor, or a positional sensor.

4. The foot propulsion mechanism according to claim 3, wherein said rotational sensor is coupled to an electric motor of the bicycle, wherein if said rotational sensor senses forward tilt of said pedal, said electric motor aids in forward propulsion of the bicycle, and if said rotational sensor senses rearward tilt of said pedal, said electric motor does not aid in forward propulsion of the bicycle.

5. The foot propulsion mechanism according to claim 1, further comprising an adjustment member for adjusting a length of said auxiliary crank arm to said pedal.

6. The foot propulsion mechanism according to claim 1, further comprising a shock absorber coupled to said auxiliary crank arm or said pedal.

7. The foot propulsion mechanism according to claim 6, wherein said pedal tilt limiter comprises said shock absorber.

8. The foot propulsion mechanism according to claim 1, further comprising a locking member configured to lock and unlock rotation of said auxiliary crank arm about said first pivot.

9. The foot propulsion mechanism according to claim 1, wherein said foot propulsion mechanism is coupled to the bicycle comprising a bicycle frame with a bottom bracket and front and rear wheels each having a center of rotation, wherein said bottom bracket of the bicycle frame is higher than the center of rotation of the rear wheel of the bicycle.

* * * * *